June 13, 1972  J. T. CULLOM  3,669,646
PROCESS FOR AUTOGENOUS SMELTING OF COPPER ORE
CONCENTRATES AND CHARGE PRODUCT THEREFOR
Filed Nov. 21, 1969  2 Sheets-Sheet 1

INVENTOR
JOHN T. CULLOM
BY Flehr, Hohbach, Test,
Albritton & Herbert
ATTORNEYS

INVENTOR
JOHN T. CULLOM
BY Flehr, Hohbach, Test
Albritton & Herbert
ATTORNEYS

United States Patent Office 3,669,646
Patented June 13, 1972

3,669,646
PROCESS FOR AUTOGENOUS SMELTING OF COPPER ORE CONCENTRATES AND CHARGE PRODUCT THEREFOR
John T. Cullom, 628 6th Ave., San Manuel, Ariz. 85631
Filed Nov. 21, 1969, Ser. No. 878,785
Int. Cl. C22b 5/08, 15/00, 15/06
U.S. Cl. 75—74
21 Claims

ABSTRACT OF THE DISCLOSURE

Process for smelting copper autogenously, and an ore charge product comprising copper ore concentrate compacted with carbonaceous fuel into nodules suitable for charging directly into a converter furnace for autogenous smelting therein. Finely divided siliceous flux may also be compacted and intimately mixed with the ore concentrate and fuel. Fuel and flux are added to a given or concentrate in accordance with the composition of the concentrate in amounts sufficient to augment the heat value of the sulfur and iron of the ore to insure autogenous smelting and to produce the desired silica-iron ratio in the converter slag.

BACKGROUND OF THE INVENTION

Field of the invention

This invention relates to the field of copper smelting, and more particularly to the field of oxidizing copper ore concentrates in a converter to produce blister copper. Still more particularly, this invention relates to the field of autogenous smelting of specially prepared and pre-treated copper ore concentrates introduced into a converter for oxidation therein.

Description of the prior art

Processes for smelting copper ore concentrates by first heating the same in a reverberatory furnace and subsequently converting the matte from the reverberatory furnace in a converter have been long known. However, conventional procedures normally require large quantities of oxidizing air during the various air blowing stages in the converter. Subsequent attempts to produce an autogenous process involved increasing the oxygen content of the blowing air to increase the heat level in the converter so that the oxidation reaction required to transform ore concentrates to blister copper will proceed automatically.

While the addition of oxygen to the blowing air produces a generally autogenous converting process, the capital investment required for an oxygen plant and its high operating costs are deterrents to extensive use of such an oxygen enrichment converting procedure. Other processes in which additional heat is added to the air blow to produce autogenous smelting produce acceptable results but are accompanied by inherent disadvantages, such as increased costs, which are out of proportion to the results obtained.

So far as is known, no prior procedures have been known or utilized in which autogenous smelting is produced by utilizing a converter furnace charge product comprising copper ore concentrate which is intimately mixed with a source of heat, such as a carbonaceous fuel, to provide the necessary additional heat required for an autogenous smelting operation without incurring the cost and other disadvantages noted above. Nor, so far as is known, has a siliceous flux in a finely divided state normally not usable in a converting process been intimately mixed with an ore concentrate.

Thus, so far as is known, the present procedure and furnace charge product are the first to utilize carbonaceous fuel, and flux, intimately compacted in nodules with coper ore concentrates in the oxidation of such concentrates to produce blister copper. While there has been some suggestion in the prior art that a reducing agent, such as coal or carbon, may be mixed with ores to effect the reduction of such ores, so far as is known, no utilization of a reducing agent in a copper ore oxidation converting procedure of the type described herein has been known or suggested heretofore.

SUMMARY OF THE INVENTION

This invention relates generally to the smelting of copper concentrates. More particularly, this invention relates to the autogenous smelting of copper concentrates without requiring the addition of oxygen to the blowing air introduced into the smelting converter. Still more particularly, this invention relates to the autogenous smelting of copper concentrates by intimately mixing a carbonaceous fuel with ore concentrates and compacting the mixture into nodules prior to charging thereof into the converter. This invention further relates to the compacting of finely divided siliceous flux with the fuel-concentrate nodules. Still more particularly, this invention relates to an oxidizing procedure for converting copper ore concentrates into blister copper by adding a reducing agent for its fuel value rather than for its reduction capability.

From the foregoing, it should be understood that objects of this invention include the provision of an improved autogenous process for smelting copper concentrates; the provision of an improved charge product for use in an autogenous smelting procedure; the provision of an improved charge product comprising copper ore concentrate and carbonaceous fuel intimately mixed and compacted into nodules for charging into a copper converter; the provision of a charge product for a copper converter which includes intimately mixed siliceous flux of a type heretofore unusable in a converter; and the provision of an improved procedure for converting copper ore by utilizing nodules of intimately mixed ore concentrate and carbonaceous fuel and, in an alternate embodiment, intimately mixed siliceous flux, as a charge material for a copper converter.

These and other objects of this invention will become apparent from a study of the following disclosure in which reference is directed to the attached drawings.

DESCRIPTION OF THE PREFERRED EMBODIMENTS

As will be set out in detail hereinafter, the present invention involves a specific improvement to one portion of an otherwise conventional copper smelting procedure, namely, the utilization of an improved charge product for a converter furnace which permits the oxidation reaction within the furnace to proceed autogenously without requiring the addition of excess air or augmenting oxygen in the manner employed previously. Before describing the particular improvements of this invention, a brief description of the conventional and oxygen enriched converting practices employed heretofore will be briefly described.

Figure 1:
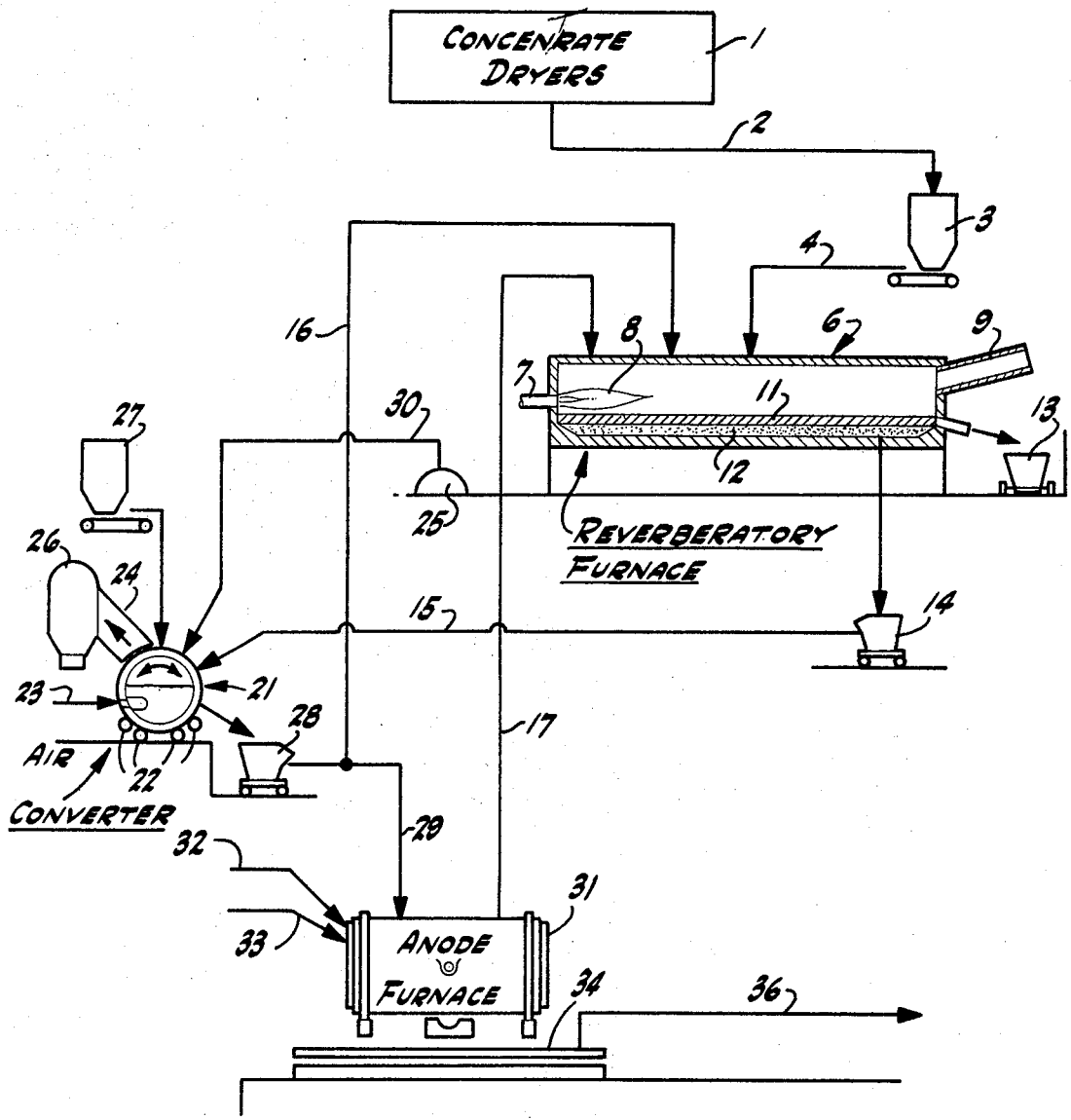
FIG. 1 is a generally diagrammatic flow sheet view illustrating a conventional smelting procedure for producing copper from copper ore concentrates.

Referring first to FIG. 1, a conventional copper smelting process utilizing a reverberatory furnace and converter will be set out. In such a procedure, the reverberatory furnace melts down copper ore concentrate and fluxes it rapidly with a minimum of heat loss at a temperature high enough to permit slag and matte to form and separate in the fluid condition. The matte is subsequently oxidized to blister copper in a converter in the second stage of the smelting operation.

Copper ore is first concentrated in known fashion by conventional procedures to a concentrate which includes approximately 30% copper. Such ore concentrate is then dried to approximately 5% moisture by weight in a concentrate dryer 1. The dried ore concentrate is carried by any suitable conveyor means 2 into storage facilities, generally designated 3, adjacent the reverberatory furnace. Such storage facilities normally also include storage means for a quantity of large chunks of siliceous flux normally utilized in copper smelting procedures in known fashion.

As required, quantities of ore concentrate and flux, in predetermined ratios, are introduced by suitable conveyor means 4 through the roof of a conventional reverberatory furnace, generally designated 6, into a plurality of feed hoppers (not shown) which are positioned to extend the length of the furnace for discharging concentrate and flux into the furnace at predetermined locations after initial start up operations thereof have been commenced. Suitable fuel burners (oil or gas), generally designated 7, produce the flames 8 which heat the interior of the furnace to the temperature level required, ranging in a typical example from approximately 2750° F. at the burner end of the furnace to approximately 2100° F. at the opposite end of the furnace defined by a flue 9 through which combustion gases exit to an exhaust stack in known fashion.

Within the furnace, the concentrate-flux charge becomes molten and separates into an upper slag layer 11 and an underlying matte layer 12. Preliminary smelting of the ore in the reverberatory furnace progresses generally continuously, the charge being replenished periodically, and the slag is discharged at selected intervals into slag pots 13 positioned adjacent the flue end of the furnace. The matte also is periodically withdrawn as required and deposited into matte ladles 14 for transfer by overhead crane means 15 to the converter to be described.

A typical copper ore concentrate charged into reverberatory furnaces 6 comprises approximately 30.6% Cu, 3.5% $SiO_2$, 28.8% Fe, 0.4% CaO, 1.9% $Al_2O_3$ and 34.5% S. Normally there is very little burning or elimination of sulfur in the reverberatory furnace. Instead, the copper, a portion of the iron, and nearly all of the sulfur, unite in the molten matte. The remainder of the iron, as an oxide, forms slag with the silica from the conventional siliceous flux introduced into the furnace with the ore concentrate. From a typical charge concentrate of the type noted, the matte produced typically assays at approximately 33.8% Cu, 36.4% Fe and 26.4% S. The slag assays typically at approximately 0.55% Cu, 31.5% $SiO_2$, 37.6% Fe, 6.8% CaO and 7.9% $Al_2O_3$.

The slag is disposed of as waste and the matte is transferred in predetermined batch quantities by the ladle and overhead crane means to the converter for the second stage of the smelting procedure. To insure maximum recovery of copper from the concentrate introduced into the system, slag from the converter, as well as from an anode furnace in which copper is refined, as will be described, is introduced through the side of the reverberatory furnace by suitable ladle and overhead crane conveyor or other conveyor means, designated 16 and 17 respectively, so that the copper contained therein may be recovered. Under certain circumstances known in the art, slag from the anode furnace may be introduced into the converter rather than into the reverberatory furnace as shown in the FIG. 1 example.

While several types of converter furnaces may be employed in the conventional smelting procedure being described, in the embodiment shown in FIG. 1 such converter, designated 21, is of the horizontally oriented type, commonly known in the trade as a Peirce-Smith type converter, which is typically approximately thirteen feet in diameter and thirty feet long having opposite closed ends. Such a converter is supported in its horizontal position by a series of supporting rollers or metal tires 22 which permit the converter to be rotated (by a suitable motor and gear reducer connected with a large ring gear secured at one end of the furnace, (not shown) so that the furnace may be rotated selectively in the clockwise or counterclockwise direction during various stages of operation of the converting procedure. A basic refractory is utilized to line the furnace in known fashion and the furnace is arranged for top charging through a suitable opening provided therethrough.

The converter utilized with the present process is conventional and includes a series of tuyeres arranged in a horizontal row at a position normally below the level of the fluid bath being treated within the converter. The tuyeres are generally designated 23 in FIG. 1 and are connected in known fashion with a supply of blowing air at approximately 15 p.s.i. and standard temperature. An exhaust stack 24 in communication with a flue 26 are provided in conjunction with the converter in known fashion for controlling the gaseous products of combustion emitted from the converter.

Matte transferred to the converter from the reverberatory furnace by conveyor means 15 is oxidized therein by introducing controlled blasts of air through the tuyeres into the molten bath. Converting of matte to blister copper is dependent upon the known preferential affinity for sulfur demonstrated by copper over iron. Sulfur normally will not be oxidized from copper so long as iron is present in combined form with sulfur. The matte is a combination of iron sulfide (FeS) and copper sulfide ($Cu_2S$) and the iron is oxidized therefrom during air blowing in the converter, according to the equation

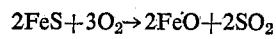

accompanied by the liberation of substantial heat.

A supply of silica flux (typically 70% $SiO_2$, 3.9% Fe, 2.6% CaO, 12% $Al_2O_3$) is added to the converter from a supply bin 27 as required and in known fashion combines with the FeO to form a slag having a typical composition of approximately 1.9% Cu, 25.7% $SiO_2$, and 47.2% Fe. The flux is added in substantially large chunks or pieces to preclude dust problems. Finely divided flux is not usable in such an arrangement.

As noted previously, the slag from the converter is normally returned to the reverberatory furnace by conveyor means 16 to reclaim the contained copper therein. The nonusable portion of the converter slag is subsequently disposed of in the reverberatory furnace slag as noted previously.

Converting of the matte in the converter 21 is a batch process and the slag therefrom is skimmed off periodically into a ladle 28 for transfer to the reverberatory furnace as noted. Such slag skimming takes place at periodic intervals until the converter contains mostly a quantity of $Cu_2S$ (commonly referred to as white metal). This white metal bath is skimmed as clean as possible of slag and is cooled somewhat by the addition of a predetermined quantity of cold dope from a supply 25 thereof which is typically a copper bearing low sulfur, low iron, scrap material, such as aisle cleanup, scrap copper or metallurgical dust. Any suitable conveyor means 30 may be utilized to introduce the cold dope in predetermined quantities into the converter.

Following introduction of the cold dope, the second stage of the process, the finish blow, commences. In the finish blow, the following reactions take place in step fashion with the evolution of substantial heat:

$$2Cu_2S + 3O_2 \rightarrow 2Cu_2O + 2SO_2$$
$$2Cu_2S + 4Cu_2O \rightarrow 12Cu + 2SO_2$$

As the copper oxide begins to form, it reacts immediately with some $Cu_2S$ until substantially all the sulfur is eliminated as $SO_2$ and blister copper remains, which comprises approximately 98% to 99% copper. The small amount of iron present with the copper, usually 2% or less, normally oxidizes to magnetite ($Fe_3O_4$) and forms a residual slag with any iron contained in the cold dope in the form of slag balls defined by magnetite and a nucleus of silica from the flux. The ball slag normally occurs on top of the copper bath and is left behind in the converter when the blister copper is removed into ladles 28 for transfer by suitable conveyor means 29 into an anode furnace 31.

In the anode furnace the blister copper is further oxidized in known fashion to remove substantially all remaining impurities. Slag from the anode furnace, as noted previously, is returned by conveyor means 17 to the reverberatory furnace or to the converter, in line with known procedures. Wood poles or gaseous reductants are introduced into the anode furnace, as indicated at 32, in conjunction with oxidizing air indicated at 33, to produce the desired copper purifying reaction therein. At the proper time, substantially pure copper of about 99.8% copper content is discharged from the anode furnace and cast into anode bars in a casting mechanism, generally designated 34, of known design and operation. The anode bars are subsequently transferred in any suitable fashion as designated by arrow 36, to a subsequent procedure for electrolytically refining the same in a standard operation.

By way of further background information, Table 1 below sets out details of a typical converter charge in a conventional oxidizing procedure in a Peirce-Smith Converter. The ore, concentrate, matte and flux compositions employed correspond to those described previously as typical, as are slag compositions.

TABLE 1

1st slag blow:
  Charge:
        70 tons matte initially; 17.5 tons matte subsequently
        9 tons flux
        3 ladles slag skimmed
  Blowing time: 10 minutes initial blow; 80 minutes secondary blow; total, 90 minutes.
  Blowing rate average: 22,500 s.c.f.m. air 2nd slag blow:
  Charge:
        35 tons matte
        9 tons flux
        6 tons aisle clean-up (cold dope)
        2½ ladles slag skimmed
  Blowing time: 60 minutes 3rd slag blow:
  Charge:
        35 tons matte
        9 tons flux
        6 tons aisle clean-up (cold dope)
        3 ladles slag skimmed
  Blowing time: 60 minutes 4th slag blow:
  Charge:
        35 tons matte
        8 tons flux
        2 ladles slag skimmed
  Blowing time: 45 minutes 5th slag blow:
  Charge:
        35 tons matte
        7 tons flux
        1¼ ladles slag skimmed
  Blowing time: 40 minutes 6th slag blow:
  Charge:
        17½ tons matte
        5 tons flux
        ¾ ladles slag skimmed
  Blowing time: 40 minutes 7th slag blow:
  Charge:
        17½ tons matte
        6 tons flux
        1½ ladles slag skimmed
  Blowing time: 35 minutes Finish blow:
  Contained matte—260 tons
  Charge: 9 tons converter flue dust
  Blowing time: 180 minutes Product: 90 tons of blister copper Such a typical procedure begins with the first slag blow commencing when four ladles of matte are placed in the converter. This blow continues for about 10 minutes after which a fifth ladle of matte is charged. The temperature at this time has increased from about 2030° F. to about 2150° F. During the initial blow period, a substantial quantity of magnetite ($Fe_2O_4$) is formed. When the bath increases to a temperature above 2150° F. a reaction takes place between the magnetite and the ferrous sulfide in which FeO is captured by the $SiO_2$ of the flux to form the converter slag noted previously, containing iron as $Fe_3O_4$ which remains free of reaction with the silica in the flux.

As the FeS portion of the matte oxidizes, a considerable amount of heat is evolved and the cold dope is added from time to time to absorb the excess heat developed, while at the same time permitting recovery of copper therefrom at a very low cost. Following the final slag blow, slag is skimmed to remove as much slag as possible, and the converter is ready for the finish blow. At that time it contains about 110 tons of $Cu_2S$ (white metal) having an iron content of about 1%, a copper of about 80%, and a sulfur content of approximately 18.8% which serves as the fuel in the final blow. This final blow will continue for approximately 180 minutes to yield about 90 tons of blister copper of 98% to 99% purity.

Figure 2:
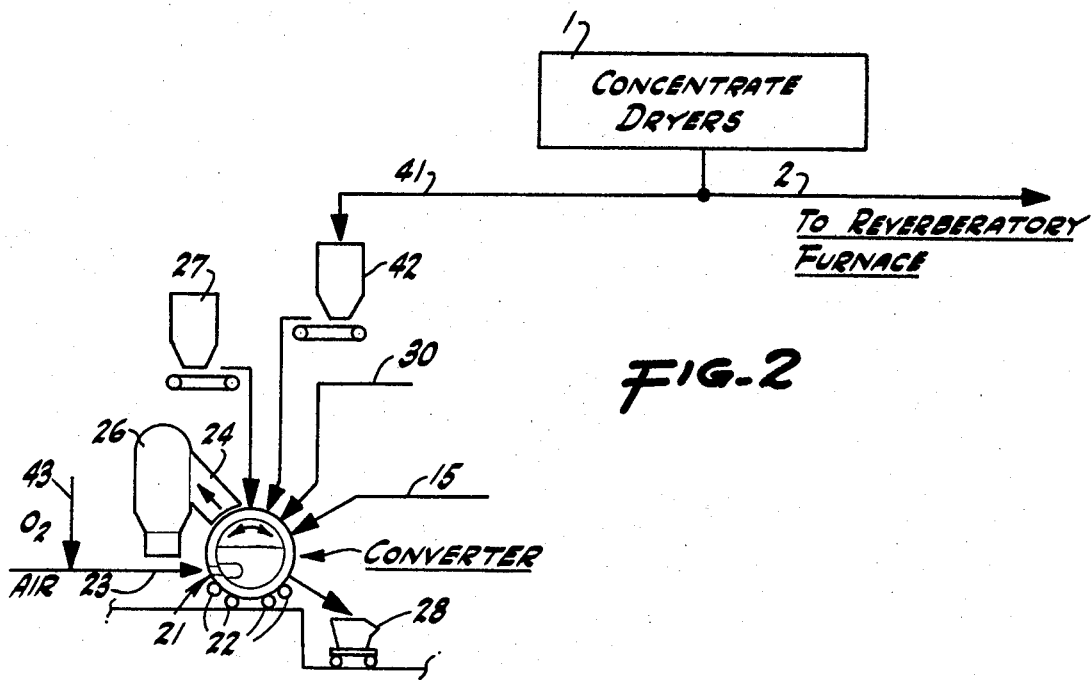
FIG. 2 is a diagrammatic view corresponding generally to a portion of FIG. 1 but showing modifications to the conventional procedure employed in the known oxygen enrichment autogenous smelting process.

As noted previously, a recent improvement over a conventional oxidation process of the illustrative type just described, embodies the enriching of the air blast at the various blow stages to an oxygen of about 30% so that the heat evolved in the oxidation of the iron and sulfur in the ore concentrates in the converter will be sufficiently high for autogenous smelting to be sustained. That is, by utilizing oxygen enrichment, a predetermined quantity of copper ore concentrate may be introduced directly from the concentrate dryer 1 into the converter 21 as noted from the schematic showing of FIG. 2. In that connection, it should be understood that FIG. 2 illustrates only that portion of the smelting procedure which is modified in an oxygen enrichment process and that the remainder of the procedure (not illustrated) is essentially the same as that described previously with respect to utilization of the reverberatory furnace and production of matte and slag therein. Matte and cold dope also are introduced into the converter in the manner previously described. In FIG. 2, reference numerals corresponding to those employed with respect to FIG. 1 identify corresponding components in the system. Ore concentrates in predetermined quantities are introduced from the concentrate dryer 1 through any suitable conveyor means 41 into a supply bin 42 from which the same may be introduced periodically into the converter 21 as required. Additionally, a source of oxygen, or oxygen enriched air, designated 43 is provided in communication with the tuyeres 23. The oxygen content of the air blow for the converter may thus be selectively increased to a predetermined level to produce autogenous smelting, such as the approximate 30% oxygen level mentioned previously. The exact oxygen level employed and length of blow of oxygen enriched air is determined in accordance with the make up of the ore concentrate being treated.

A typical converting procedure utilizing the oxygen enriched or oxygen augmentation procedure just summarized is set out in Table 2.

TABLE 2

1st slag blow:
    Charge: 65 tons ore concentrate and 68 tons matte
        8 tons flux
    Blowing time: Total, 131 minutes; $O_2$ enriched blow, 107 minutes at 28.6% $O_2$
    Blowing rate average: 16,430 s.c.f.m. air; 4718 s.c.f.m. $O_2$ during enrichment
    Concentrate feed: 92 minutes with 2629 s.c.f.m. air.
2nd slag blow:
    Charge:
        34 tons matte
        28 tons ore concentrate
        10 tons flux
    Blowing time: Total, 77 minutes; $O_2$ enriched blow, 66 minutes at 27.2% $O_2$
    Blowing rate average: 15,620 s.c.f.m. air; 4250 s.c.f.m. $O_2$ during enrichment
    Concentrate feed: 43 minutes with 2600 s.c.f.m. air.
3rd slag blow:
    Charge:
        26 tons matte
        7 tons cold dope
        7 tons flux
    Blowing time: 80 minutes at 18,420 s.c.f.m. air.
4th slag blow:
    Charge:
        26 tons matte
        7 tons matte shell
        14 tons flux
    Blowing time: 50 minutes with 18.610 s.c.f.m. air.
5th slag blow:
    Charge:
        12 tons copper slag
        3 tons flux
    Blowing time: 30 minutes with 17,920 s.c.f.m. air.
Finish blow:
    Charge: 14 tons anode furnace rejects at approximately 99.6% Cu
    Blowing time: 180 minutes with 18,630 s.c.f.m. air.

With such a procedure a total of 93 tons of concentrate were smelted in the first two slag blows by means of enriched air with oxygen. The remainder of the charge and smelting procedure was generally conventional as in the procedure described previously.

Figure 3:
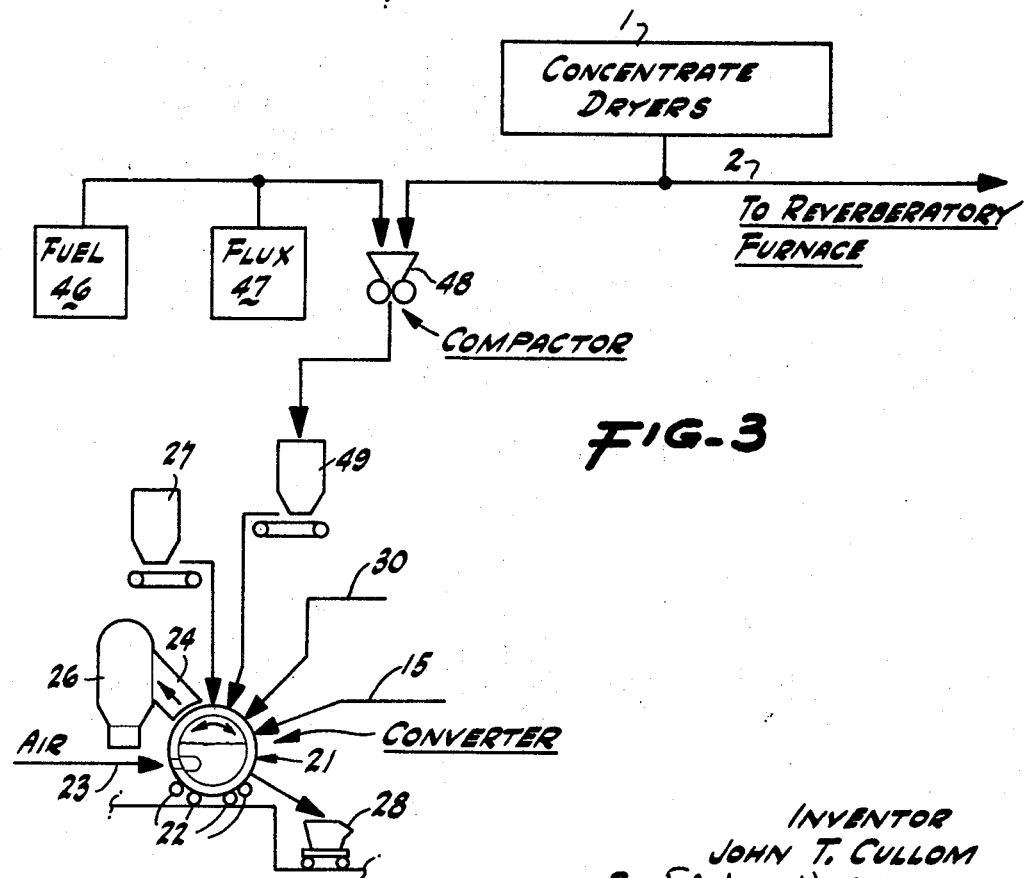
FIG. 3 is a diagrammatic view corresponding to a portion of FIG. 1 which illustrates modification of the conventional process by the autogenous smelting procedure of this invention.

It will be noted from FIG. 3 that the specific improvement of this invention is produced in the second smelting step carried on within the converter 21. The improved ore concentrate charge product of this invention is introduced into the converter for reaction therein with predetermined quantities of matte produced in the reverberatory furnace in the manner described previously with respect to FIG. 1. With the modified and improved arrangement of FIG. 3, a supply of carbonaceous fuel, generally designated 46, is positioned adjacent the converter at any suitable location as is a supply of siliceous flux, generally designated 47, which has the general chemical formulation commonly employed heretofore in copper smelting but in a form heretofore not usable in a converter furnace.

Interposed between converter 21 and the concentrate dryer 1 and the respective sources of fuel and flux 46 and 47 is means for intimately mixing ore concentrate from the dryer with carbonaceous fuel, and flux when desired, in a selective manner. Such mixing means, designated 48, may take various forms as will be described. A supply bin for concentrates mixed with fuel, and with flux when desired, is indicated at 49. The specially prepared ore concentrate is introduced from supply bin 49 into the converter 21 for autogenous reaction therein, with selected quantities of matte from the reverberatory furnace and cold dope from the sources described previously.

The purpose of the mixing means 48 is to form quantities of fuel and ore concentrates in predetermined ratios into dust free nodules, or similar compacted shapes, suitable for charging into the converter without dust loss. The mixing means chosen should have within its capability the thorough mixing and compacting of concentrate particles and fuel (either in liquid or finely divided powder form) into the nodular shape preferred. The mixing means 48 also should have the capability to mix finely divided flux particles with the fuel-ore concentrate mixture to provide self-fluxing nodules found very valuable in an autogenous smelting operation.

Carbonaceous fuel is mixed with the ore concentrate in amounts sufficient to augment the fuel value of the iron and sulfur contained in the concentrate so that autogenous smelting can take place with normal air blowing in the converter, that is, without requiring oxygen enriched air or excess quantities of air. The finely divided silica flux to be mixed with the ore concentrate can be obtained from various sources, including those previously considered waste, such as from the recovery of a siliceous concentrate by flotation from the mill tailings of a concentrate mill. Irrespective of the source, the flux employed is in the finely divided particulate state which heretofore was not usable in a converter of the type described because of dusting problems.

As recognized in autogenous smelting proposals, the heat balance during autogenous converting requires upgrading and by increasing oxygen content to about 30% as in the prior known procedure, oxidation is accelerated to a rate which compensates for the inherent deficiency in heat value of the ore concentrate. With the present improvement, such heat deficiency is made up by utilizing inexpensive readily available fuel rather than expensive oxygen requiring special equipment for its production.

Despite the fact that a reductant (carbonaceous fuel) is being introduced into an oxidation process so that the oxidizing reaction is somewhat slowed in accordance with the amount of reductant introduced, the slight decrease in converter output is preferable to and more desirable than the substantial capital costs and increased operating expenses encountered with oxygen enrichment procedures. Thus, by utilizing low cost carbonaceous fuels of the type to be described, an improved low cost procedure for autogenous smelting can be effected without encountering the substantially increased costs characteristic of oxygen enrichment and other procedures utilized heretofore. Because the additional heat requirements for autogenous smelting are relatively low in the smelting oxidation procedure, the novel introduction herein of a reducing agent into the oxidizing process does not interfere to any appreciable extent with the expeditious oxidation of sulfur and iron from the iron sulfide and copper sulfide contained in the converter bath so that the subject process may proceed profitably in actual production conditions. By utilizing the increased heating value of carbonaceous fuel in the copper ore concentrate, a conventional air blow rate of about 22,000 cubic feet per minute of air, under standard conditions at a pressure of about 15 pounds per square inch, may be utilized. Thus, excess quantities of air or oxygen enriched air are not required.

The subject process resembles the conventional converting procedure described above with respect to FIG. 1 in so far as development of slag in the converter is concerned. However, the source of matte in the converter after initial charge up will be from the ore concentrate smelted directly in the converter, or from a combination of such converter matte with matte from the reverberatory furnace, depending upon the relative production rates of the reverbratory furnace and the converter employed in a particular plant.

In the embodiment of this invention which adds silica flux particles to the nodules of ore concentrate-fuel, fluxing will be more efficient because of the substantial increase of flux surface area compared to that of conventional fluxing procedures in which flux is charged in coarse particles or chunks to prevent dust loss as it is introduced into the converter. The intimate contact of the flux employed herein in the finely powdered state in which it is mixed with the ore concentrate-fuel nodules makes it readily accessible to the iron as it oxidizes in the converter. Such accessibility is responsible for the increased fluxing efficiency experienced with the present invention.

The carbonaceous fuels which may be utilized in the present smelting procedure include those carbonaceous fuels which are available commercially at relatively low cost, of which the following are exemplary: all grades of fuel oil or other petroleum fractions, coke breeze, petroleum coke, black liquor, carbonaceous wood by-products, and all qualities of coal in finely divided state. Hereinafter reference is directed by way of specific example to use of No. 6 Grade fuel oil and coal of a specified heating value but it should be understood that the other carbonaceous fuels noted can be utilized also.

Because the heating values of the various fuels identified are well known, the ratios of their inclusion in the charge product nodules may be determined in accordance with the exemplary illustrations set out hereinafter. In that connection, it should be understood that the heating value of a particular fuel utilized is determinative of the qauntity used in connection with a given ore concentrate and that a qualified metallurgical engineer can make such a determination based on materials available to him. As noted, the purpose of the fuel addition to the ore concentrate is to augment the natural fuel value of the iron and sulfur contained in the concentrate. If such iron and sulfur in the concentrate is of a high value, the fuel addition may be reduced proportionately. Furthermore, if the iron and sulfur content is very high, autogenous smelting in the converter could proceed without augmentation. For example, if the ore concentrate comprised approximately 20% copper, 35% iron, and 35% sulfur, augmentation would normally not be necessary for autogenous smelting to occur. However, concentrates of that iron-sulfur content are not readily available so augmentation is desirable.

The exact choice of fuel employed at a particular plant will normally be dictated by the fuel cost and availability in the particular area in which the converter operation is situated. By way of specific example, Table 3 below exemplifies the improved smelting procedure of this invention in which a charge of ore concentrate having the typical assay noted previously was employed. Such typical concentrate is dried in the concentrate dryer to about 5% moisture by weight.

With a concentrate charge of the assay noted, it has been found that the natural heat value of the iron and sulfur in the concentrate can be effectively augmented if fuel is added in an amount which is approximately equivalent to the heating value of approximately 70 pounds of coal, finely divided, of approximately 14,000 b.t.u. rating, for each ton of concentrate. That is, using a concentrate of the noted type, it has been found that about 71 pounds of coal of the noted b.t.u. rating (or equivalent carbonaceous fuel, liquid or solid) added and intimately mixed and compacted with each ton of concentrate will produce an autogenous smelting procedure. Similarly, about 7 gallons of No. 6 fuel oil per ton of concentrate of the noted assay will produce the autogenous smelting results sought.

While the specific fuel-to-concentrate ratio is effective for smelting ores of the typcial assay noted, it has been found that utilizing quantities of carbonaceous fuel in the range of approximately 2% to approximately 5% by weight is effective for autogenous smelting, with a percentage of about 3.5% fuel by weight normally being effective to produce desired results. The exact fuel-to-concentrate ratio employed, however, will be calculated in accordance with the particular type of fuel and ore concentrate being employed in a given smelting operation.

In the case of ore concentrates containing larger than normal quantities of ferrous sulfide or ferric sulfide, the amounts of fuel added can be lowered proportionally, and in the case of concentrates having less fuel content in the form of ferrous sulfide or ferric sulfide, the fuel addition will be increased proportionally.

The nodule producing mixing and compacting means 48 may comprise any suitable equipment including conventional flaking rolls, pelletizing drums or saucers, or other devices commonly employed in material handling operations to yield a compacted product comprised of discrete particles or nodules which are dust free.

With the foregoing in mind, Table 3 sets out one specific operating example example detailing the present invention employed to smelt an ore concentrate augmented with reverberatory furnace matte of the composition previously noted.

TABLE 3

1st. slag blow:
    Charge:
        70 tons matte initially; 17.5 tons matte subsequently.
        9 tons flux
        3 ladles slag skimmed
    Blowing time: 90 minutes
    Blowing rate average: 22,500 s.c.f.m. air.
2nd slag blow:
    Charge:
        40 tons concentrate plus fuel, (71 pounds of coal of 14,000 b.t.u. heat value per tons of concentrate) at 1 ton/minute
        9 tons fiux
        6 tons aisle clean-up (cold dope)
        3 ladles slag skimmed
    Blowing time: 75 minutes
3rd slag blow:
    Charge:
        35 tons matte
        9 tons fiux
        6 tons ladle cold dope
        3 ladles slag skimmed
    Blowing time: 60 minutes 4th slag blow:
   Charge:
      40 tons concentrate plus fuel
      9 tons flux
      2 ladles slag skimmed
   Blowing time: 65 minutes
5th slag blow:
   Charge:
      35 tons matte
      7 tons flux
      1½ ladles slag skimmed
   Blowing time: 40 minutes
6th slag blow:
   Charge:
      20 tons concentrate plus fuel
      5 tons flux
      ¾ ladles slag skimmed
   Blowing time: 45 minutes
7th slag blow:
   Charge:
      17½ tons matte
      6 tons flux
      1½ ladles slag skimmed
   Blowing time: 35 minutes
Finish blow:
   Contained matte—190 tons
   Contained concentrate—100 tons
   Charge: 9 tons converter flue dust
   Blowing time: 180 minutes
Product: Remove 90 tons of blister copper Matte from the reverberatory furnace is employed to initiate the oxidation procedure in the converter. Also, in the example of Table 3, additional matte is introduced periodically to utilize the product of the reverberatory furnace. However, it has been found, by selection of proper balance between the amounts of carbonaceous fuel and ore concentrate employed, that autogenous smelting can be effected without the necessity to introduce additional reverberatory furnace matte after initial charge up and blows.

As noted previously, this invention further incorporates the addition of finely divided flux into the nodules of fuel and ore concentrate. While the amount of flux introduced into the system may vary, depending upon the assay of the ore concentrate employed and the source of the flux utilized, flux in the range of approximately 10% to 25% by weight per ton of ore concentrate has been found generally effective. Specifically, it has been found that about 20% flux by weight for each ton of concentrate, produces effective results when the ore concentrate being smelted has the typical assay noted previously.

It should be understood, of course, that the exact amount of flux employed per ton of concentrate will be selected so that a converter slag of the usual type will result. Such a self-fluxing compacted ore concentrate charge product will smelt autogenously in the converter and the iron oxide will be fluxed in a more efficient manner than normal when large chunks of flux heretofore used are employed.

By way of specific example, Table 4 below exemplifies the autogenous smelting procedure of this invention when a self-fluxing ore concentrate in compacted nodular form is employed. In such an arrangement, approximately 420 pounds of finely divided siliceous flux per ton of ore concentrate was utilized.

TABLE 4

1st slag blow:
   Charge:
      70 tons matte initially; 17.5 tons matte subsequently.
      9 tons flux
      3 ladles slag skimmed
   Blowing time: 90 minutes
   Blowing rate average: 22,500 s.c.f.m.
2nd slag blow:
   Charge:
      40 tons concentrate at 1 ton/minute
      6 tons aisle clean-up (cold dope)
      3 ladles slag skimmed
   Blowing time: 70 minutes
3rd slag blow:
   Charge:
      35 tons matte
      9 tons flux
      6 tons cold dope
      3 ladles slag skimmed
   Blowing time: 60 minutes
4th slag blow:
   Charge:
      40 tons concentrate
      2 ladles slag skimmed
   Blowing time: 60 minutes
5th slag blow:
   Charge:
      35 tons matte
      7 tons flux
      1½ ladles slag skimmed
   Blowing time: 40 minutes
6th slag blow:
   Charge:
      20 tons concentrate
      ¾ ladles slag skimmed
   Blowing time: 45 minutes
7th slag blow:
   Charge:
      17½ tons matte
      6 tons flux
      1½ ladles slag skimmed
   Blowing time: 35 minutes
Finish blow:
   Contained matte—190 tons
   Contained concentrate—100 tons
   Charge: 9 tons flue dust
   Blowing time: 180 minutes
Product: Remove 90 tons blister copper Thus it will be noted that added flux is not required in the successive blows except in those situations when matte is charged into the converter.

Calculations have established that compacted ore concentrates of the type described, utilizing carbonaceous fuels therewith within the ranges noted, can effect substantial savings per ton of copper produced in the autogenous smelting procedure described, compared to a conventional converter operation or an oxygen enriched operation of the types described previously.

Having thus made a full disclosure of this invention reference is directed to the appended claims for the scope of protection to be afforded thereto.

What is claimed is:

1. An autogenous process for smelting copper bearing ore by oxidizing said ore directly and solely in an oxidizing converter furnace in a single stage oxidizing procedure to produce blister copper ready for refining without requiring the addition of substantial amounts of excess air or free oxygen into the converter utilized in the process to effect such autogenous smelting and without requiring additional preliminary treating equipment, such as a roaster or reverberatory furnace, in conjunction with such autogenous process, comprising
   (A) providing a supply of copper ore concentrate including quantities of copper, iron and sulfur therein,
   (B) providing a supply of carbonaceous fuel,
   (C) intimately mixing predetermined quantities of said fuel with predetermined quantities of said concentrate,
   (D) compacting such intimately mixed quantities of fuel and concentrate into dust free nodules,
   (E) charging said nodules in predetermined amounts directly into a converter furnace for direct oxidation therein without preliminary treatment thereof in a roaster or reverberatory or like furnace, and (F) directly oxidizing the ore in said compacted nodules solely in said converter in a single stage oxidizing procedure by heating said charged nodules in said converter without requiring excess quantities of air or the addition of free oxygen thereto to produce a converter bath comprised of blister copper and slag.

2. The process of claim 1 which also includes (G) providing a supply of finely divided siliceous flux, and (H) intimately mixing predetermined quantities of said flux with said predetermined quantities of fuel and concentrate prior to compacting thereof into said dust free nodules.

3. The process of claim 1 in which said fuel is mixed with said ore concentrate in quantities sufficient to augment the fuel value of the iron and sulfur in said concentrate so that autogenous smelting may occur in said converted when the same is operated generally in accordance with standard oxidation procedure.

4. The process of claim 1 in which said fuel is mixed with said concentrate in quantities within the range of approximately 2% to approximately 5% by weight of ore concentrate dried to approximately 5% moisture by weight.

5. The process of claim 4 in which about 3.5% by weight of said fuel is mixed with said ore concentrate.

6. The process of claim 1 in which said fuel is mixed with said concentrate in an amount by weight which is approximately equivalent to the heat value of approximately seventy pounds of coal of approximately 14,000 B.t.u. rating per ton of concentrate dried to approximately 5% moisture and comprising approximately 30.6% Cu, 3.5% $SiO_2$, 28.8% Fe, 0.4% CaO, 1.8% $Al_2O_3$, and 34.5% S.

7. The process of claim 2 in which said flux is mixed with said ore concentrate and fuel in quantities by weight within the range of approximately 10% to approximately 25% flux per tone of concentrate.

8. In an autogeneous oxidation process for smelting copper ore by oxidizing said ore directly and solely in an oxidizing furnace in a single stage oxidizing procedure to produce blister copper ready for refining without requiring preliminary oxidizing treatment or the addition of substantial amounts of excess air or free oxygen into the converter utilized in the process to effect such autogenous smelting, which includes (A) producing a copper matte starter charge in a first furnace from an ore including copper, iron and sulfur, (B) introducing predetermined quantities of said matte for use as a starter charge into an oxidizing converter, (C) introducing predetermined quantities of compacted dust free nodules of intimately mixed copper ore concentrate, including copper, iron and sulfur, and carbonaceous fuel directly into said converter for oxidation therein with said matte, (a) said nodules being introduced directly into said converter for single stage oxidation therein without preliminary treatment thereof in a roaster or reverberatory or like furnace, and (D) directly oxidizing the bath formed by said matte and said compacted nodules solely in said converter in a single stage oxidizing procedure by introducing air into said bath, such oxidation proceeding autogenously without requiring the input of excess quantities of air or of additional heat or oxygen into said converter by utilizing the heating value of the iron and sulfur in said ore concentrate and in said matte augmented by the heating value of said carbonaceous fuel in said nodules, whereby said ore is oxidized directly to blister copper and slag in a single stage oxidizing procedure solely in said converter.

9. The process of claim 8 which also includes (E) intimately mixing predetermined quantities of finely divided siliceous flux with said ore concentrate and fuel prior to compacting the same into said dust free nodules for introduction into said converter.

10. The process of claim 8 in which said fuel is mixed with said ore concentrate in quantities sufficient to augment the fuel value of the iron and sulfur in said concentrate so that autogenous smelting may occur in said converter when the same is operated generally in accordance with standard oxidation procedures.

11. The process of claim 8 in which said fuel is mixed with said concentrate within the range of approximately 2% to approximately 5% by weight of ore concentrate dried to approximately 5% moisture by weight.

12. The process of claim 11 in which about 3.5% by weight of said fuel is mixed with said concentrate.

13. The process of claim 8 in which said fuel is mixed with said concentrate in an amount which is approximately equivalent to the heat value of approximately seventy pounds of coal of approximately 14,000 B.t.u. rating per ton of concentrate dried to approximately 5% moisture and comprising approximately 30.6% Cu, 3.5% $CiO_2$, 28.8% Fe, 0.4% CaO, 1.8% $Al_2O_3$, and 34.5% S.

14. The process of claim 9 in which said flux is mixed with said concentrate and fuel in quantities by weight within the range of approximately 10% to approximately 25% flux per ton of concentrate.

15. A product for charging directly into an oxidizing converter in the direct smelting of copper ore solely in said oxidizing converter to produce blister copper ready for refining in an autogenous oxidation process without preliminary treatment thereof in a roaster or reverberatory or like furnace and without requiring the addition of substantial amounts of excess air or free oxygen into the converter during the oxidizing process to effect such autogenous smelting; said charge product comprising compacted dust free nodules of intimately mixed predetermined quantities of copper ore concentrate, which includes copper, iron and sulfur therein, and a carbonaceous fuel united with said concentrate in said compacted nodules, said carbonaceous fuel united with said ore concentrate in said nodules augmenting the heating value of the iron and sulfur contained in said ore concentrate so that oxidation of said nodules charged into said converter will proceed autogenously in said converter in a single stage oxidizing procedure therein without requiring quantities of excess air or free oxygen to effect such oxidation autogenously.

16. The product of claim 15 which further includes predetermined quantities of finely divided siliceous flux mixed with said concentrate and fuel to provide said compacted dust free nodules.

17. The product of claim 15 in which said fuel is present in said product in quantities sufficient to augment the fuel value of the iron and sulfur in said ore concentrate so that autogenous smelting may occur in said converter when the same is operated generally in accordance with standard oxidation procedures.

18. The product of claim 17 which includes approximately 2% to approximately 5% by weight of said fuel per ton of ore concentrate.

19. The product of claim 18 which contains about 3.5% of said fuel by weight per ton of ore concentrate.

20. The product of claim 15 in which said fuel is present in said product in an amount which is approximately equivalent to the heat value of approximately seventy pounds of coal of approximately 14,000 B.t.u. rating per ton of concentrate dried to approximately 5% moisture and comprising approximately 30.6% Cu, 3.5% $SiO_2$, 28.8% Fe, 0.4% CaO, 1.8% $Al_2O_3$, and 34.5% S.

21. The product of claim 16 which includes approximately 10% to approximately 25% by weight of flux per ton of ore concentrate.

References Cited
UNITED STATES PATENTS

| | | | |
|---|---|---|---|
| 1,976,735 | 10/1934 | Kuzell | 75—74 X |
| 2,194,454 | 3/1940 | Greenawalt | 75—74 |
| 1,860,585 | 5/1932 | Lenander | 75—74 X |
| 2,668,107 | 2/1954 | Gordon | 75—74 |
| 2,784,078 | 3/1957 | Greenawalt | 75—74 X |
| 3,069,254 | 12/1962 | Queneau | 75—82 |
| 3,533,779 | 10/1970 | Fine | 75—74 |
| 3,556,773 | 1/1971 | Grenfell | 75—72 X |
| 3,473,918 | 10/1969 | Foard | 75—72 X |
| 3,561,951 | 2/1971 | Themelis et al. | 75—73 |
| 3,589,892 | 6/1971 | Peterson | 75—76 X |

L. DEWAYNE RUTLEDGE, Primary Examiner

J. E. LEGRU, Assistant Examiner

U.S. Cl. X.R.

75—72